United States Patent [19]

Hanft

[11] 3,733,566

[45] May 15, 1973

[54] VARIABLE OUTPUT RESONATOR COUPLING LOOP HAVING SHORTED TURN MOUNTED ABOUT FLEXIBLE CONNECTING CONDUCTOR

[75] Inventor: Herbert Hanft, Alexandria, Va.

[73] Assignee: Westinghouse Electric Corporation, Pittsburgh, Pa.

[22] Filed: June 3, 1971

[21] Appl. No.: 149,581

[52] U.S. Cl.................333/82 B, 333/73 C, 333/83 R

[51] Int. Cl.............................H01p 7/04, H01p 5/04

[58] Field of Search.....................333/73 C, 83, 82 B; 330/56

[56] References Cited

UNITED STATES PATENTS

| | | | |
|---|---|---|---|
| 3,624,563 | 11/1971 | Burley | 333/82 B |
| 2,945,189 | 7/1960 | Rowe | 333/82 B |
| 1,718,278 | 6/1929 | Dubilier | 317/253 |

*Primary Examiner*—Paul L. Gensler
*Attorney*—F. H. Henson and E. P. Klipfel

[57] ABSTRACT

A flexible windup connector at each end of a coupling loop within a resonant cavity is enclosed in a shorted turn which minimizes the inductance change of each connector as the coupling loop is varied from maximum to minimum.

6 Claims, 4 Drawing Figures

VARIABLE OUTPUT RESONATOR COUPLING LOOP HAVING SHORTED TURN MOUNTED ABOUT FLEXIBLE CONNECTING CONDUCTOR

CROSS REFERENCES TO RELATED APPLICATIONS

In copending application Ser. No. 250,128 filed May 4, 1972 by the present inventor and assigned to the same assignee, there is described and claimed an adjustable inter-resonator coupling which permits coupling between cavities in a multi-resonator filter to be adjustable in a stepless fashion.

In U.S. Pat. No. 3,624,563, filed July 3, 1969, entitled "Coil And Fixed Tap Input Coupling For Variably End-Loaded Coaxial Filter, Giving Linear Q With Tuning Change, Suitable For Multicoupler Applications", by Henry E. Burley and William H. Martin and owned by the same assignee, there is disclosed and claimed an input coupling for a multi-resonator filter.

BACKGROUND OF THE INVENTION

1. Field of the Invention

The present invention relates generally to multicouplers and more particularly relates to a non-sliding contact with a variable output coupling loop used in VHF multicouplers.

2. Description of the Prior Art

Prior art variable output couplings for VHF multicoupler channel filters utilize a wiping contact to bridge the windup connection at each end of the coupling loop. The wiping contact deteriorated in use, however, and is generally unreliable for electrical connection.

SUMMARY OF THE INVENTION

Briefly, the present invention avoids the use of a wiping contact by means of a simple shorted turn. The shorted turn replaces the wiping contact because of its inductive coupling. As the flexible windup conductor at each end of the coupling loop expands or contracts the resulting variance in inductance is minimized by the shorted turn which inductively makes an electrical connection across the windup conductor. In such a manner, the inductive reactance of the coupling loop remains within a permissible range from minimum to maximum coupling positions.

BRIEF DESCRIPTION OF THE DRAWINGS

For a better understanding of the invention, reference may be had to the preferred embodiment, exemplary of the invention, shown in the accompanying drawings, in which.

DETAILED DESCRIPTION OF THE INVENTION

Multiple signals may be coupled to a single antenna by means of equipment called multicouplers. Generally, multicouplers are used to couple transmitters or receivers to antennas. The VHF multicoupler described hereinafter is suitable for use with transmitters and/or receivers.

Figure 1:
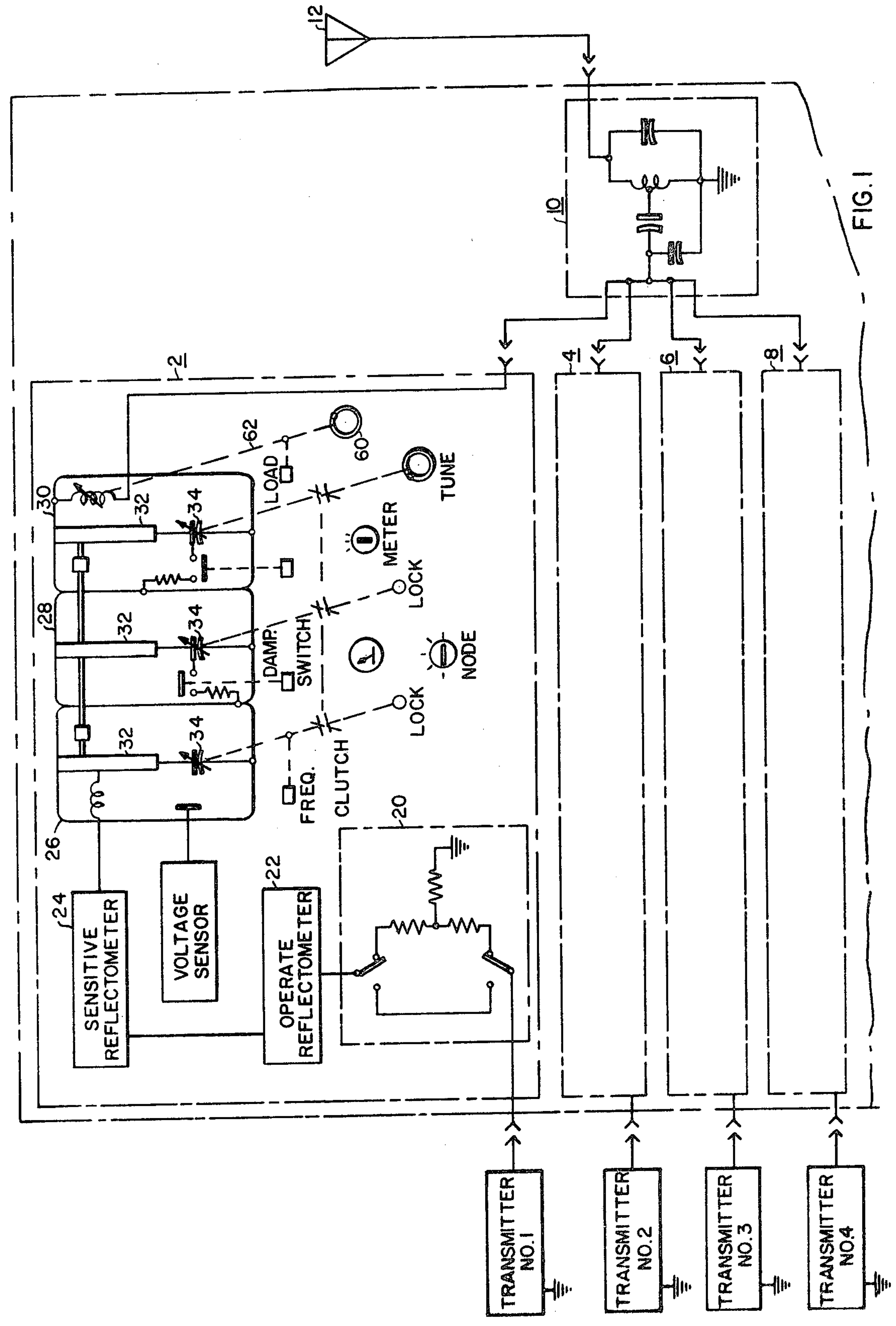
FIG. 1 is a simplified schematic diagram of an antenna coupler group utilizing the present invention.

A multicoupler group is illustrated in FIG. 1 as comprising four channel couplers 2, 4, 6 and 8 which are connected to a combining network 10 whose output is sent to a VHF antenna 12.

In each channel coupler a transmitter input goes through a power attenuator 20, operate reflectometer 22 and reflectometer 24 to the input of the first cavity or resonator 26. A multistage filter is provided by cavity resonators 26, 28 and 30. Each resonator includes a short coaxial line, with a center conductor 32 and a variable capacitor 34. RF power is coupled from the input resonator 26 to the second resonator 28 which is in turn coupled to the third resonator 30.

Figures 2, 3:
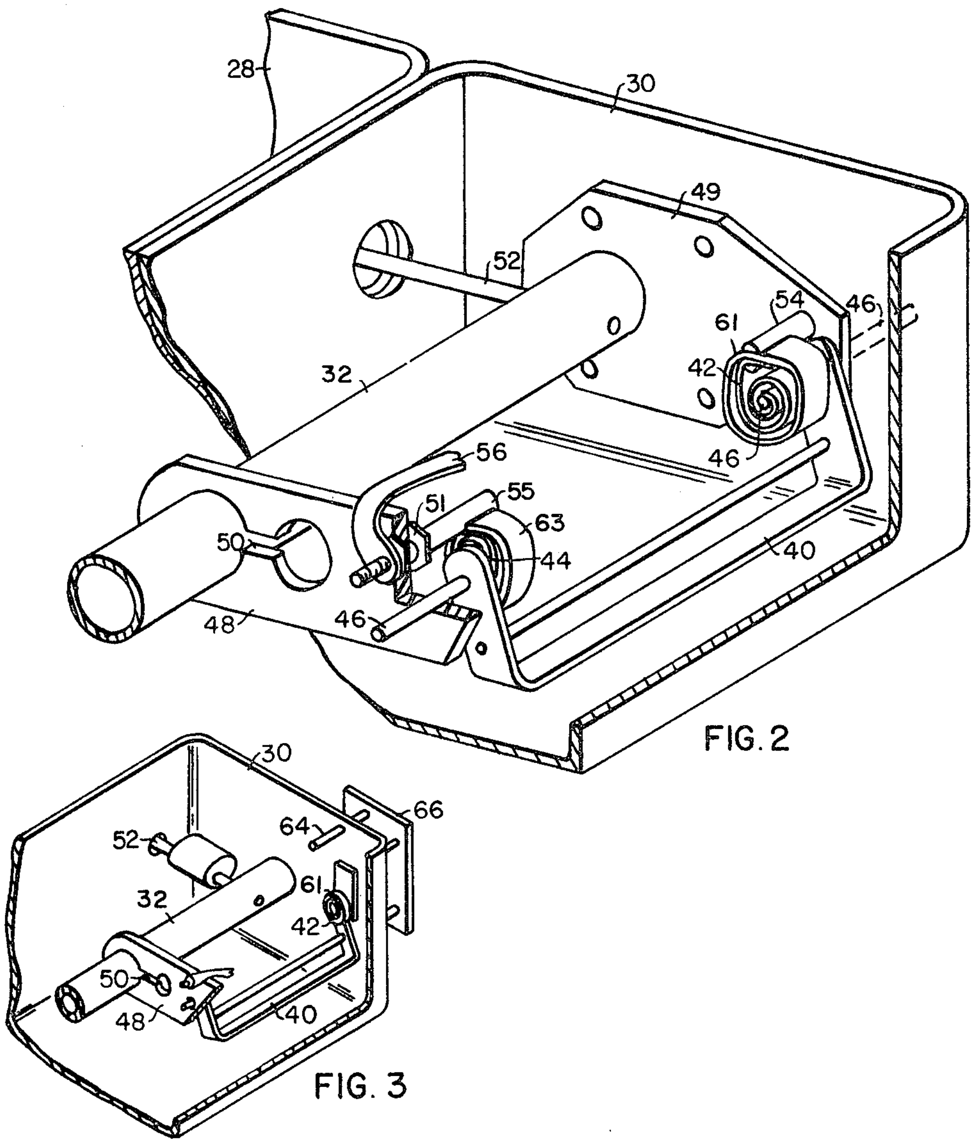
FIG. 2 is a breakaway view of the output resonant cavity with the cover removed to show an illustrative embodiment of the present invention.
FIG. 3 is a similar view of an alternate embodiment of the present invention.

The present invention is related to the third and output cavity 30 of the three-pole filter illustrated. FIG. 2 shows an illustrative embodiment of the present invention with the output cavity 30 cut away and the cover thereof removed.

More particularly, an output coupling loop 40 is rotatably supported at each end by a shaft 46 that is connected to a windup flexible conductor 42 and 44. The drive shaft 46 rotates the coupling loop through a travel range of 180°. An insulator support 48 is secured to the inner conductor 32 by clamping means 50 and supported at its opposite end by a cavity wall hole (not shown). A grounded terminal 49 at one end serves as a mounting plate for one end of the loop 40. An ungrounded terminal 51 at the opposite end of the loop 40 is brought out of the cavity 30 by a step 56. An inter-resonator coupling 52 connects the adjoining cavity 28 to the output cavity 30.

The flexible conductors 42 and 44 are wound up like a clock mainspring about the driving shaft 46. The coupling loop 40 makes electrical connection with the flexible conductor 42 at the driving shaft 46. The opposite end of the flexible conductor is secured to a support stud 54. A similar stud 55 secures the windup conductor 44 to the insulator support 48. The output strap 56 connects the coupling coil 40 to the coaxial connection leading to the combining network 10 and hence to the antenna 12.

It can be seen that as the position of the output coupling loop 40 is varied the flexible conductor 42 will wind and unwind thereby changing its inductance value. Such inductance change can vary greatly and be detrimental to proper coupling to the antenna 12.

To limit the change in inductance as windup or unwinding occurs, shorted turns 61 and 63 are disposed at opposite ends of the coupling loop 40, each peripherally mounted about its respective windup conductor 42 and 44. The shorted turn 61 or shield couples to the flexible coupling 42 to substantially short out the inductance change resulting in alteration of the flexible connector configuration. In such a manner, the shorted turn 61 minimizes the inductance change as the coupling loop 40 is varied from maximum to minimum when rotated over a full 180°.

An alternate embodiment of the present invention is as illustrated in FIG. 3. Like character references have been assigned to similar items. More particularly, in this embodiment the coupling loop is varied by means of the load control 60 on the front panel of the coupler 2 of FIG. 1. A gear train mechanically couples the control shaft 62 to an insulated shaft 64 that is coupled to a small gear train 66 located on the back of the output resonator 30. The small gear train 66 mechanically drives the variable coupling loop 40. The dielectric shaft 64 actually passes through the output resonator cavity. Both the main gear train and the small gear train contain anti-backlash gears that keep the position of the loop constant, once the loading control is locked.

Figure 4:
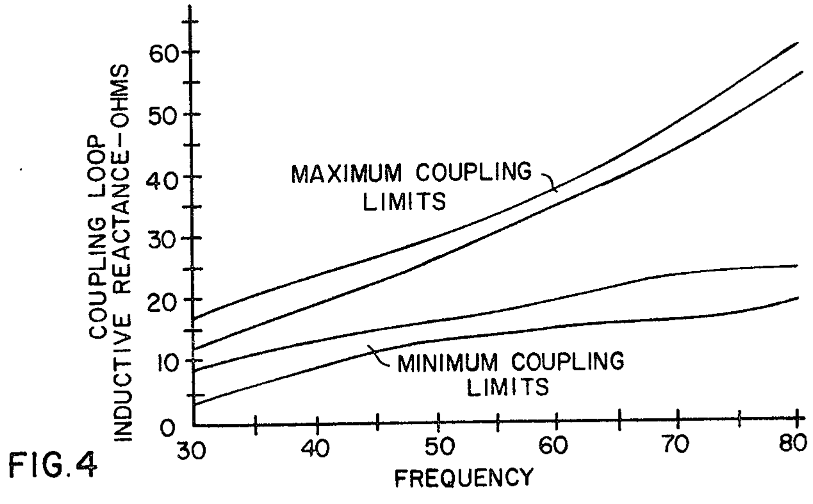
FIG. 4 is a graphical representation of the required inductive reactance limits of the output variable coupling loop of the illustrative embodiment shown in FIGS. 2 and 3.

The development of the output coupling loop was largely empirical. The amount of matching the capability achieved by iteratively varying the output tuning capacitor 34 and the coupling loop was electrically measured. The measurements were made using a 3:1 VSWR dummy load that simulated an antenna. The acquired data was analyzed to yield the limits of required coupling loop inductance. FIG. 4 illustrates the requirements with respect to frequency.

The range of inductance the coupling loop must have when it is in its maximum coupling setting, as shown in FIG. 4, must be adequate to insure both sufficient coupling capability and impedance matching to a 3:1 VSWR load. The lower limit is the reactance range that makes the output cable connected across the output coupling loop and to the combining network nominally a quarter-wave stub. When the coupling loop 40 is in its minimum position, the channel coupler is virtually completely decoupled.

It will, therefore, be apparent that there has been disclosed a resonator coupling permitting signal transfer from a transmitter to an antenna or from an antenna to a receiver. The sliding contact usually utilized was subject to wear with its attendant variances in resistance and hence dependability. The shorted turn disclosed in accordance with the present invention shields or connects the windup conductor electrically thereby minimizing changes in inductance due to alterations of the configuration of the flexible connector.

While the present invention has been described with a degree of particularity for the purposes of illustration, it is to be understood that all modifications, suggestions and alterations within the spirit and scope of the present invention are herein meant to be included.

I claim as my invention:

1. In a resonator, the combination comprising; an output coupling loop rotatably mounted within said resonator to vary the amount of RF power to be extracted from said resonator; flexible means for electrically connecting each end of said loop in electrical circuit to extract the power from the resonator; and a shorted turn mounted about the flexible means at each end of said loop for electrically shielding said flexible means to minimize the inductance change in the flexible means as it expands and contracts in response to rotational movement of said coupling loop.

2. In a channel coupler used to connect either a transmitter or receiver to a VHF antenna, the combination comprising; a resonant cavity; an inner conductor, end loaded by a variable capacitor to obtain resonance over a wide range of frequencies; a loop for coupling RF power to or from said cavity; a flexible conductor wound at each end of said loop for providing continuous electrical contact with said coupling loop; and a shorted turn mounted at each end of said loop for shielding the flexible conductor to minimize the inductance change in the flexible conductor as it expands and contracts due to varying the position of said coupling loop.

3. The combination of claim 2 wherein each shorted turn is connected to loop terminals.

4. The combination of claim 2 including an insulator mounted on the center conductor of said cavity for supporting the flexible connector at one end of said coupling loop.

5. The combination of claim 2 wherein said coupling loop is rotatable over 180°.

6. In an output resonator cavity, the combination comprising; a variable coupling loop; coupling loop terminals; a drive shaft for positioning said coupling loop within the cavity; a flexible conductor wound in the form of a mainspring at each end of said coupling loop with the free end of each flexible conductor connected to said coupling loop; a support stud connecting the opposite end of each flexible conductor to the coupling loop terminals; and a shorted turn mounted about each flexible conductor to inductively connect the windup conductor provided by the flexible terminal to minimize the inductance change in the flexible terminal as it changes its shape due to the positioning of the coupling loop.

* * * * *